Patented Feb. 20, 1923.

1,445,660

UNITED STATES PATENT OFFICE.

WARREN F. BLEECKER, OF BOULDER, COLORADO, ASSIGNOR TO THE TUNGSTEN PRODUCTS COMPANY, OF BOULDER, COLORADO, A CORPORATION OF COLORADO.

PROCESS FOR THE EXTRACTION OF VANADIUM AND RADIUM FROM CARNOTITE ORE

No Drawing.  Application filed September 7, 1920.  Serial No. 408,599.

*To all whom it may concern:*

Be it known that I, WARREN F. BLEECKER, a citizen of the United States, residing at Boulder, in the county of Boulder and State of Colorado, have invented certain new and useful Improvements in Processes for the Extraction of Vanadium and Radium from Carnotite Ores, of which the following is a specification.

This invention relates to a process for the extraction of vanadium and radium from carnotite ores.

The process consists briefly in heating carnotite ores carrying the minerals above referred to in an acid soluble condition, with a mixture of a soluble fluorine compound, hydrochloric acid and sodium nitrate. This treatment of the ore results in the complete decomposition of the vanadium and radium constituents, making them soluble in the acid solution, which solution may subsequently be removed by filtration in any desired manner.

The soluble fluorine compound may consist of a mixture of calcium fluoride (fluorspar) and sodium silicate, hydrofluoric acid, sodium fluoride or any other fluoride soluble under the conditions of the present process.

Its object is to assist the hydrochloric acid in decomposing the complex vanadium mineral, and where a mixture of sodium silicate and calcium fluoride is used the sodium silicate functions to render the calcium fluoride soluble in the dilute hydrochloric acid.

The function of the nitrate is to effect a partial oxidation of the mineral without completely oxidizing all of the compounds therein, it being understood that although a complete oxidation would not interfere with the reaction, the minimum quantity required to give the desired results, is preferable.

The heating period of the mixture of the ore and chemicals may be varied according to the time required to obtain the desired decomposition and the altitude of the place at which the process is carried on.

Although it is preferred to maintain the heat at or near the boiling point, the reaction will proceed at a lesser temperature in a proportionately increased period of time, it having been found that while at a boiling temperature, the desired results were obtained in about one hour, the reaction would proceed to completion within three or four days at a temperature of twenty degrees centigrade.

While the reaction is effective in treating material in which the radium has been rendered acid soluble by any appropriate method, I prefer to use carnotite concentrates which previously have received an alkaline digestion such as described in my application for patent, No. 387,671, filed June 9, 1920. The ore in a finely divided condition is mixed with an alkali-metal carbonate and sufficient water is added to form a paste which is digested by the application of heat under pressure, the product of the digestive action is filtered to remove the alkaline liquor and soluble sulphates, and the carnotite residue is treated as hereinbefore described.

It is advisable to dry the carbonate residue at a temperature not to exceed three hundred degrees centigrade, and before mixing with chemicals the dried material must be broken up in a suitable crushing device.

The object in drying the residue is to effect a partial dehydration or removal of the major portion of the water of constitution, which greatly facilitates ultimate filtration of the acid treated material. It must be understood however, that this action is purely physical and that the chemical reaction will proceed to completion whether the material is dry or wet.

The following proportions of chemicals for the treatment of 2000 pounds of dried residue of the alkaline digestion of carnotite ores will result in the complete decomposition and solution of the vanadium and radium constituents of the ore during a heating period of about one hour at a temperature not exceeding three hundred degrees Fahrenheit.

| | Pounds. |
|---|---|
| Hydrochloric acid (12° Beaumé) | 4600 |
| Calcium fluoride (fluorspar) | 200 |
| Sodium silicate | 25 |
| Sodium nitrate | 42 |

If hydrofluoric acid is used as the soluble fluorine compound, one hundred pounds is sufficient to assist in effecting the desired decomposition of 2000 pounds of dried residue.

Having thus described my invention what I claim and desire to secure by Letters Patent is:

1. The process of extracting vanadium and radium from carnotite ores consisting in heating the ore in a finely divided condition in intermixture with hydrochloric acid, an oxidizing agent and a soluble fluoride.

2. The process of extracting vanadium and radium from carnotite ores consisting in heating the ore in a finely divided condition in intermixture with hydrochloric acid, calcium fluoride, sodium silicate and sodium nitrate.

3. The process of extracting vanadium and radium from a residue of an alkaline digestion of carnotite ores, consisting in heating the residue in a finely divided condition, in intermixture with hydrochloric acid, a soluble fluoride and sodium nitrate.

4. The process of extracting vanadium and radium from a residue of an alkaline digestion of carnotite ores, consisting in first drying the residue and then heating the same, together with hydrochloric acid, a soluble fluoride and sodium nitrate.

5. The process of extracting vanadium and radium from a residue of an alkaline digestion of carnotite ores, consisting in first drying 2000 pounds of the residue and then heating the same, together with hydrochloric acid 4600 pounds, calcium fluoride 200 pounds, sodium silicate 25 pounds and sodium nitrate 42 pounds.

6. The process of extracting radium and vanadium from carnotite ores consisting in mixing the ore in a finely divided condition with an alkaline carbonate and a liquid, heating the mixture under pressure to a high temperature, separating the alkaline liquor from the product, and heating the residue with hydrochloric acid and a fluoride.

7. The process of extracting radium and vanadium from carnotite ores consisting in mixing the ore in a finely divided condition with an alkaline carbonate and a liquid, heating the mixture under pressure to a high temperature, separating the alkaline liquor from the product, drying the residue and heating the dried residue with hydrochloric acid and a fluoride.

8. The process of extracting vanadium and radium from a residue of an alkaline digestion of carnotite ores consisting in heating 2000 pounds of the residue together with hydrochloric acid 4600 pounds, calcium fluoride 200 pounds, and sodium nitrate 42 pounds.

In testimony whereof I have affixed my signature.

WARREN F. BLEECKER.